US009817540B2

(12) United States Patent
Want et al.

(10) Patent No.: US 9,817,540 B2
(45) Date of Patent: Nov. 14, 2017

(54) DEVICE, SYSTEM, AND METHOD OF COMPOSING LOGICAL COMPUTING PLATFORMS

(75) Inventors: Roy Want, Los Altos, CA (US); Trevor Pering, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1385 days.

(21) Appl. No.: 11/967,318

(22) Filed: Dec. 31, 2007

(65) Prior Publication Data
US 2009/0172583 A1 Jul. 2, 2009

(51) Int. Cl.
*G06F 3/0481* (2013.01)
*G06F 3/0482* (2013.01)
*H04L 12/58* (2006.01)
*H04M 1/725* (2006.01)
*H04L 29/08* (2006.01)
*G06F 9/50* (2006.01)
*H04L 12/28* (2006.01)

(52) U.S. Cl.
CPC .......... *G06F 3/0481* (2013.01); *G06F 3/0482* (2013.01); *G06F 3/04817* (2013.01); *G06F 9/5044* (2013.01); *H04L 12/281* (2013.01); *H04L 51/00* (2013.01); *H04L 67/00* (2013.01); *H04L 67/04* (2013.01); *H04L 67/16* (2013.01); *H04L 67/303* (2013.01); *H04M 1/72519* (2013.01)

(58) Field of Classification Search
CPC ....... H04L 51/00; H04L 67/00; H04L 12/281; H04L 67/04; H04L 67/16; H04L 67/303; G06F 3/0481; G06F 9/5044

USPC ................................................. 715/771, 736
See application file for complete search history.

(56) References Cited

U.S. PATENT DOCUMENTS

| 5,418,844 | A | * | 5/1995 | Morrisey | H04M 3/4228 379/114.05 |
| 5,524,146 | A | * | 6/1996 | Morrisey | H04M 3/4228 379/221.02 |
| 5,815,793 | A | * | 9/1998 | Ferguson | 725/131 |
| 5,841,854 | A | * | 11/1998 | Schumacher et al. | 379/265.11 |
| 6,084,951 | A | * | 7/2000 | Smith et al. | 379/93.17 |
| 6,091,956 | A | * | 7/2000 | Hollenberg | 455/456.5 |

(Continued)

FOREIGN PATENT DOCUMENTS

EP 1878284 A1 * 1/2008
WO WO 2006117438 A1 * 11/2006

Primary Examiner — Jeffrey A Gaffin
Assistant Examiner — John M Heffington

(57) ABSTRACT

Device, system, and method of composing logical computing platforms. For example, a wireless computing device includes: one or more wireless transceivers to send and receive wireless communication signals; a logical platform composition manager to provide a visual indication representing a logical platform that includes said wireless computing device and one or more wireless devices; and an input unit to receive a user selection corresponding to the visual representation; wherein, in response to the user selection, the logical platform composition manager is to command the one or more wireless transceivers to establish one or more wireless communication links between the wireless computing device and the one or more wireless devices.

13 Claims, 3 Drawing Sheets

(56) References Cited

U.S. PATENT DOCUMENTS

| | | | |
|---|---|---|---|
| 6,182,052 B1* | 1/2001 | Fulton | G06Q 10/02 705/26.8 |
| 6,226,367 B1* | 5/2001 | Smith et al. | 379/142.04 |
| 6,442,263 B1* | 8/2002 | Beaton et al. | 379/142.04 |
| 6,571,290 B2* | 5/2003 | Selgas et al. | 709/228 |
| 6,593,941 B1* | 7/2003 | Sameshima | 715/716 |
| 6,608,637 B1* | 8/2003 | Beaton et al. | 715/762 |
| 6,859,845 B2* | 2/2005 | Mate | 710/5 |
| 7,424,485 B2* | 9/2008 | Kristiansen et al. | |
| 7,466,805 B2* | 12/2008 | Timmins | G06Q 30/02 379/114.13 |
| 7,599,859 B2* | 10/2009 | Fulton | G06Q 10/02 705/26.35 |
| 7,657,920 B2* | 2/2010 | Arseneau et al. | 725/133 |
| 7,730,339 B2* | 6/2010 | Wang | 713/323 |
| 7,739,620 B1* | 6/2010 | Kong et al. | 715/810 |
| 7,831,932 B2* | 11/2010 | Josephsoon et al. | 715/863 |
| 7,861,188 B2* | 12/2010 | Josephsoon et al. | 715/863 |
| 7,907,966 B1* | 3/2011 | Mammen | 455/557 |
| 7,975,056 B2* | 7/2011 | Gmuender et al. | 709/228 |
| 7,983,206 B2* | 7/2011 | Tian | 370/312 |
| 8,051,452 B2* | 11/2011 | Arseneau et al. | 725/74 |
| 8,140,968 B2* | 3/2012 | Tobioka | 715/275 |
| 8,199,113 B2* | 6/2012 | Madonna et al. | 345/172 |
| 8,275,863 B2* | 9/2012 | Selgas et al. | 709/221 |
| 8,391,773 B2* | 3/2013 | Arseneau et al. | 455/3.06 |
| 8,391,774 B2* | 3/2013 | Arseneau et al. | 455/3.06 |
| 8,391,825 B2* | 3/2013 | Arseneau et al. | 455/403 |
| 8,432,489 B2* | 4/2013 | Arseneau et al. | 348/461 |
| 8,732,318 B2* | 5/2014 | Selgas et al. | 709/228 |
| 8,938,060 B2* | 1/2015 | Timmins | H04M 3/4931 379/218.02 |
| 2001/0047263 A1* | 11/2001 | Smith et al. | 704/275 |
| 2002/0029275 A1* | 3/2002 | Selgas et al. | 709/227 |
| 2002/0087674 A1* | 7/2002 | Guilford et al. | 709/223 |
| 2003/0177205 A1* | 9/2003 | Liang | H04L 12/2697 709/220 |
| 2003/0195968 A1* | 10/2003 | Selgas et al. | 709/228 |
| 2003/0204606 A1* | 10/2003 | Selgas et al. | 709/228 |
| 2003/0210275 A1* | 11/2003 | Draschwandtner | G06F 9/45512 715/810 |
| 2004/0015592 A1* | 1/2004 | Selgas et al. | 709/228 |
| 2004/0015975 A1* | 1/2004 | Nandigama | G06F 9/5044 718/104 |
| 2004/0030752 A1* | 2/2004 | Selgas et al. | 709/206 |
| 2004/0046795 A1* | 3/2004 | Josephson et al. | 345/764 |
| 2004/0088398 A1* | 5/2004 | Barlow | 709/223 |
| 2004/0198334 A1* | 10/2004 | Chmaytelli et al. | 455/419 |
| 2004/0204133 A1* | 10/2004 | Andrew et al. | 455/566 |
| 2004/0242216 A1* | 12/2004 | Boutsikakis | 455/418 |
| 2004/0243945 A1* | 12/2004 | Benhase et al. | 715/853 |
| 2004/0266468 A1* | 12/2004 | Brown et al. | 455/518 |
| 2005/0012818 A1* | 1/2005 | Kiely et al. | 348/143 |
| 2005/0037755 A1* | 2/2005 | Hind et al. | 455/435.3 |
| 2005/0113074 A1* | 5/2005 | Holt et al. | 455/414.1 |
| 2005/0177416 A1* | 8/2005 | Linden | 705/14 |
| 2005/0192052 A1* | 9/2005 | Tenhunen | 455/557 |
| 2005/0197964 A1* | 9/2005 | Duggan | G06Q 30/06 705/57 |
| 2005/0221807 A1* | 10/2005 | Karlsson et al. | 455/418 |
| 2005/0233767 A1* | 10/2005 | Ayyeppen et al. | 455/557 |
| 2006/0020900 A1* | 1/2006 | Kumagai et al. | 715/767 |
| 2006/0145843 A1* | 7/2006 | Lin | 340/539.26 |
| 2006/0190546 A1* | 8/2006 | Daniell | 709/206 |
| 2006/0212819 A1* | 9/2006 | Tobioka | 715/764 |
| 2006/0250975 A1* | 11/2006 | Grech et al. | 370/252 |
| 2006/0252442 A1* | 11/2006 | Nurmi | 455/518 |
| 2007/0019068 A1* | 1/2007 | Arseneau et al. | 348/74 |
| 2007/0019069 A1* | 1/2007 | Arseneau et al. | 348/74 |
| 2007/0021055 A1* | 1/2007 | Arseneau et al. | 455/3.06 |
| 2007/0021056 A1* | 1/2007 | Arseneau et al. | 455/3.06 |
| 2007/0021057 A1* | 1/2007 | Arseneau et al. | 455/3.06 |
| 2007/0021058 A1* | 1/2007 | Arseneau et al. | 455/3.06 |
| 2007/0022438 A1* | 1/2007 | Arseneau et al. | 725/45 |
| 2007/0022445 A1* | 1/2007 | Arseneau et al. | 725/74 |
| 2007/0022446 A1* | 1/2007 | Arseneau et al. | 725/74 |
| 2007/0022447 A1* | 1/2007 | Arseneau et al. | 725/74 |
| 2007/0035513 A1* | 2/2007 | Sherrard et al. | 345/157 |
| 2007/0058041 A1* | 3/2007 | Arseneau et al. | 348/157 |
| 2007/0067142 A1* | 3/2007 | Kavaklioglu et al. | 702/182 |
| 2007/0078925 A1* | 4/2007 | Neil et al. | 709/201 |
| 2007/0098002 A1* | 5/2007 | Liu | H04N 21/43615 370/422 |
| 2007/0118809 A1* | 5/2007 | Ozugur et al. | 715/776 |
| 2007/0121867 A1* | 5/2007 | Ozugur et al. | 379/201.1 |
| 2007/0135114 A1* | 6/2007 | Valentino | 455/422.1 |
| 2007/0143679 A1* | 6/2007 | Resner | 715/706 |
| 2007/0174330 A1* | 7/2007 | Fox et al. | 707/102 |
| 2007/0233287 A1* | 10/2007 | Sheshagiri | G06F 8/20 700/83 |
| 2008/0034331 A1* | 2/2008 | Josephsoon et al. | 715/863 |
| 2008/0057949 A1* | 3/2008 | Christensen et al. | 455/426.1 |
| 2008/0057998 A1* | 3/2008 | Christensen et al. | 455/550.1 |
| 2008/0092069 A1* | 4/2008 | Chan et al. | 715/763 |
| 2008/0115125 A1* | 5/2008 | Stafford et al. | 718/1 |
| 2008/0133716 A1* | 6/2008 | Rao et al. | 709/220 |
| 2008/0144652 A1* | 6/2008 | Valine | 370/465 |
| 2008/0158148 A1* | 7/2008 | Madonna et al. | 345/156 |
| 2008/0163075 A1* | 7/2008 | Beck et al. | 715/759 |
| 2008/0256107 A1* | 10/2008 | Banga et al. | 707/102 |
| 2008/0287125 A1* | 11/2008 | Hind et al. | 455/432.1 |
| 2008/0309617 A1* | 12/2008 | Kong et al. | 345/157 |
| 2009/0007016 A1* | 1/2009 | Lindberg et al. | 715/835 |
| 2009/0013380 A1* | 1/2009 | Chandrasiri et al. | 726/3 |
| 2009/0031005 A1* | 1/2009 | Swanson et al. | 709/218 |
| 2009/0063635 A1* | 3/2009 | Pierce et al. | 709/205 |
| 2009/0109995 A1* | 4/2009 | Alam et al. | 370/463 |
| 2011/0013549 A1* | 1/2011 | Urie | 370/312 |

\* cited by examiner

DEVICE, SYSTEM, AND METHOD OF COMPOSING LOGICAL COMPUTING PLATFORMS

BACKGROUND

A user may utilize a computing device (e.g., a desktop computer, a laptop computer, or the like) to perform various tasks or activities, for example, word processing or image editing. The user may manually and individually connect the computing device in sequence to a set of external peripherals. For example, the user may manually and individually connect the computing device to a display unit; the user may then manually and individually connect the computing device to a set of audio speakers; and finally, the user may manually and individually connect the computing device to an external storage device.

Unfortunately, the connection process may be time consuming, effort consuming, or error-prone. For example, the user may be required to physically connect cables between the computing device and each of the multiple peripherals, one by one.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
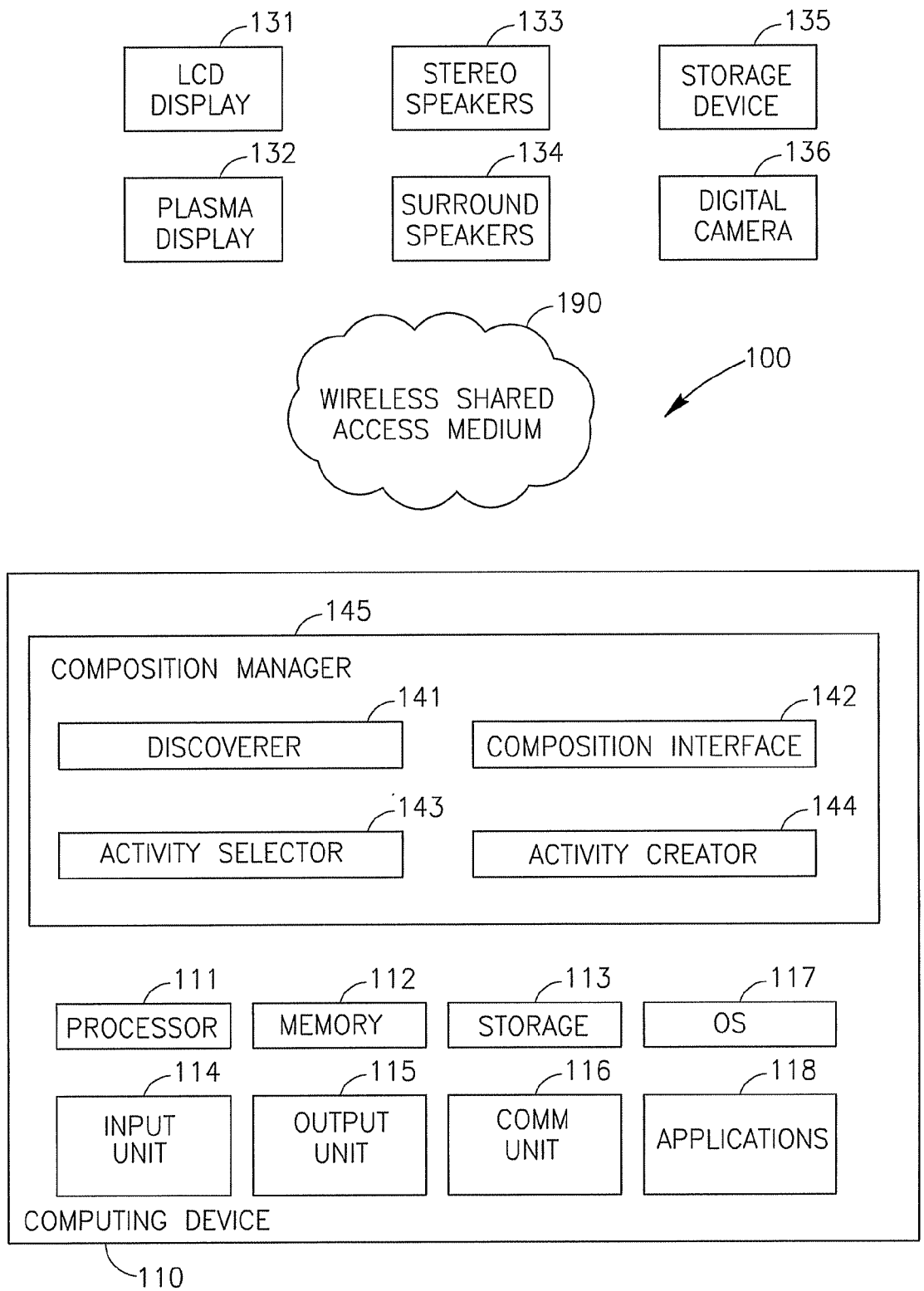
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, ZigBee (TM), Ultra-Wideband (UWB), Global System for Mobile communication (GSM), 2 G, 2.5 G, 3 G, 3.5 G, Enhanced Data rates for GSM Evolution (EDGE), or the like. Embodiments of the invention may be used in various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Although portions of the discussion here relate, for demonstrative purposes, to composition of a system or platform including a computing device and wireless devices, embodiments of the invention may be used, for example, in conjunction with composition of a system or platform including a computing device and one or more wireless services (e.g., optionally provided through one or more wireless devices). For example, a wireless service may include one or more applications or software components that are executed by a processor, which may be used to make a device or a service accessible through a wireless connection network. Wireless services may include, for example, Virtual Network Computing (VNC) for remotely controlling a computing device, Samba or other storage services or printing services, or the like. In some embodiments, wireless services may utilize client/server architecture; for example, the server is associated with the target device; the client runs on a remote computer, may connect to the server, and provides the means by which an application may remotely control the server and hence the associated device.

The term "computing device" as used herein may optionally include, for example, a computer able to connect to a wireless network. In some embodiments, for example, wireless services are supported by a wireless computer, thereby making them accessible over the network. In some embodiments, (e.g., utilizing UWB communication), the availability of some wireless services may be advertised (e.g., using Layer-2 discovery) before connections are formed in the network.

FIG. 1 schematically illustrates a block diagram of a system 100 in accordance with some demonstrative embodiments of the invention. System 100 includes, for example, a computing device 110 and multiple wireless services or wireless devices or peripherals located externally to the computing device 110, for example, a LCD display unit 131, a plasma display unit 132, a pair of stereo audio speakers 133, a set of surround-sound audio speakers 134, an external storage device 135, and a digital camera 136. Components of system 100 may communicate using wired or wireless links, for example, through a wireless shared access medium 190.

Computing device 110 includes, for example, a laptop computer, a notebook computer, a desktop computer, a tablet computer, a PDA device, a cellular phone, a mobile phone, a hybrid device (e.g., combining cellular phone functionalities with PDA device functionalities), a relatively small computing device, a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Computing device 110 includes, for example, a processor 111; an internal memory unit 112 (e.g., Random Access Memory (RAM)); an internal storage unit 113 (e.g., a hard disk drive); an input unit 114 (e.g., a screen integrated within the housing or body of computing device 110, or connected through a wire to computing device 110); an output unit 115 (e.g., a keyboard, a mouse, a touch-pad, or the like); a communication unit 116 (e.g., one or more transceivers and/or antennas, a wireless Network Interface Card (NIC), a modem, or the like); an Operating System (OS) 117; and one or more applications 118.

Devices 131-136 may have wireless communication capabilities, and may include wireless devices and/or wireless services. In some embodiments, for example, each one of devices 131-136 may be able to wirelessly communicate computing device 110 using one or more wireless communication links, e.g., using IEEE 802.11 communication, using 802.11n communication, using IEEE 802.16 communication, using Bluetooth communication, using Ultra Wide-Band (UWB) communication, using direct high-bandwidth PAN connections, or the like. In some embodiments, one or more of devices 131-136 may be a gateway or a server able to provide a wireless service or a remote service, e.g., a wireless or remote storage service, a wireless or remote viewing service, a wireless or remote printing service, or the like.

In some embodiments, system 100 allows intuitive and dynamic composition of a logical platform or a logical computing system, composed of multiple shared-resources (e.g., wireless devices and/or wireless services) provided by separate computers or separate hardware units. For example, system 100 allows a user to simultaneously connect his mobile computing device 110 (e.g., laptop computer) to both an external display unit (e.g., LCD display unit 131) and to digital camera 136, thereby creating a logical computing system tailored for editing of digital images.

In some embodiments, system 100 and/or computing device 110 may include hardware components and/or software modules to perform one or more operations of dynamic and atomic composition of logical platforms. For example, a detector or discoverer module 141 automatically searches, detects and/or identifies one or more resources or wireless devices (e.g., of devices 131-136) that are available to wirelessly connect with computing device 110. A composition interface 142 automatically generates and presents to the user of computing device 110 graphical and/or textual representations of the resources available for composition. An activity selector module 143 allows the user to select an activity or task (e.g., "edit photos", "watch movie", "check email", or the like) from a list of one or more pre-defined activities or tasks, each activity or task associated with a set of composition instructions. An activity creator module 144 allows the user to define or create a new activity or task and to associate it with a set of composition instructions, using a visual or graphical interface, for example, using a drag-and-drop interface, using a point-and-click interface, using a connect-the-dots interface (e.g., to draw lines among graphical representations of components of the logical computing system), or the like. Modules 141-144 may be implemented, for example, using a composition manager 145 module or application.

In some embodiments, the user of computing device 110 presses a pre-defined button or graphical representation that represents and triggers a set of instructions for assembling or composing the respective resources into a single logical computing system. Once the user selects or activates the button, multiple wireless links among the shared resources are automatically established. For example, in response to the user selection of a representation of a logical computing system, the composition manager 145 commands one or more transceivers of the communication unit 116 to establish wireless communication links with two or more wireless devices and/or wireless services included in the selected logical platform.

In some embodiments, the set of instructions corresponding to the composition represented by each button is created using a graphical editor, using a drag-and-drop interface, using a point-and-click interface, using a connect-the-dots interface (e.g., to draw lines among graphical representations of components of the logical computing system), or the like. Once a logical system composition is created, and includes multiple devices and a set of multiple wireless links, the composition may be saved under a name, a tag, or other shortcut or alias for subsequent re-utilization. Multiple logical system compositions may be created, and may be saved in association with multiple respective names, for selective re-utilization.

System 100 allows dynamic set-up of logical system compositions having atomic nature. For example, the dynamic set-up utilizes multiple options available for the composition which are determined at runtime (e.g., selection of a display unit from multiple display units 131-132; selection of audio speakers from multiple sets of audio speakers 133-134; or the like). The composition is atomic, for example, since two or more remote services or components may be added to the logical composition using a single command or a single mouse-click or a single operation. This may, for example, reduce the composition overhead, reduce the time required for the user to complete the composition process, and reduce the number of operations that a user is required to perform in order to complete the composition process. Some embodiments may further reduce the complexity of the logical platform composition process, thereby making the process user-friendly and error-free for some users.

Some embodiments allow the user to rapidly form a logical system composition that encompasses multiple external components or resources, with low user overhead for the composition process. For example, system 100 allows streamlining of the logical system composition process, and allows creation of multiple connections substantially simultaneously, in parallel, or in series.

In some embodiments, system 100 may be used in conjunction with various use-cases, contexts of use, or platform types. For example, in a home environment, system 100 may be used to connect a portable display unit and mobile storage device to a home PC. In a digital health environment, system 100 may be used to connect a user's UMD to a physician's computer monitor and office medical test equipment. Some embodiments thus allow rapid and convenient composition of multiple devices into a single logical platform, without overhead of manually composing multiple components together each time the composition process is required.

In some embodiments, system 100 utilizes UWB for wireless communication among two or more components. The UWB communication allows encoding of service information into the Media Access Control (MAC) level discovery protocol, allowing users to be rapidly notified about potential compositions before wireless connections are actually formed. Some embodiments may thus utilize compositions based on short-range wireless connections, and may utilize mobility as the dynamic basis by which resources are made available or unavailable.

In some embodiments, system 100 allows dynamic or non-static composition of logical computing platforms, for example, in contrast with a conventional docking station into which a laptop computer is inserted for creation of multiple pre-defined connections with multiple pre-defined and non-changing components. Some embodiments further allow dynamic and atomic compositions that include one or more computing devices, or one or more mobile computing devices (e.g., two laptop computers), in contrast with a conventional docking station able to accommodate a single mobile device. Accordingly, system 100 may provide the user with a computing experience improved over the architecture of a conventional wired docking station, and may allow context-aware computing or context-aware creation of computing platforms.

Some embodiments improve or expand the ability of computing device 110 to share display units, storage devices, and other peripherals or resources with nearby electronic devices, thereby allowing rapid and convenient aggregation of shared resources into a single logical platform. System 100 allows dynamic composition of multiple disparate resources using a single command, as well as aggregation of multiple composition steps into a single logical action. In response to the single command, multiple remote components or services are automatically interconnected, for example, substantially simultaneously, in parallel, or in series.

In some embodiments, the multiple wireless links established in response to a single command may be wireless links of various types and may have different properties. For example, a first wireless link may be an IEEE 802.11 link, a second wireless link may be an IEEE 802.16 link, a third wireless link may be a Bluetooth link, and a fourth wireless link may be a UWB link. In some embodiments, a first wireless link may be unidirectional link (e.g., between a full-size keyboard and a laptop computer), whereas a second wireless link may be bi-directional (e.g., between a laptop computer and an external storage device). In some embodiments, the multiple wireless links may be established in parallel, in sequence, substantially sequentially, substantially simultaneously, in accordance with a pre-defined order, or the like.

Although portions of the discussion herein relate, for demonstrative purposes, to automatic establishment of multiple wireless communication links to form a composed platform, embodiments of the invention are not limited in this regard. For example, some embodiments may be used in conjunction with automatic establishment of a single wireless communication links to form a composed platform, in response to a user selection of a visual representation of the link to be established or the platform to be composed.

Although portions of the discussion herein relate, for demonstrative purposes, to automatic establishment of multiple wireless communication links among three or more devices to form a composed platform, embodiments of the invention are not limited in this regard. For example, some embodiments may be used in conjunction with automatic establishment of one or more wireless communication links between two devices to form a composed platform, in response to a user selection of a visual representation of the link to be established or the platform to be composed.

In some embodiments, the composition manager 145 may be part of one of the multiple devices to be wirelessly connected; for example, the composition manager 145 may be included in a first device, and the composition manager 145 may be used to automatically create a platform that wirelessly connects the first device with a second device. In other embodiments, the composition manager 145 need not be part of any the multiple devices to be wirelessly connected; for example, the composition manager 145 may be included in a first device, or may be a separate or stand-alone unit; and the composition manager 145 may command other devices to automatically create a platform that wirelessly connects such other devices. In some embodiments, the composition manager 145 need not be implemented as part of one of the two or more devices intended to form the wireless connection.

Figure 2:
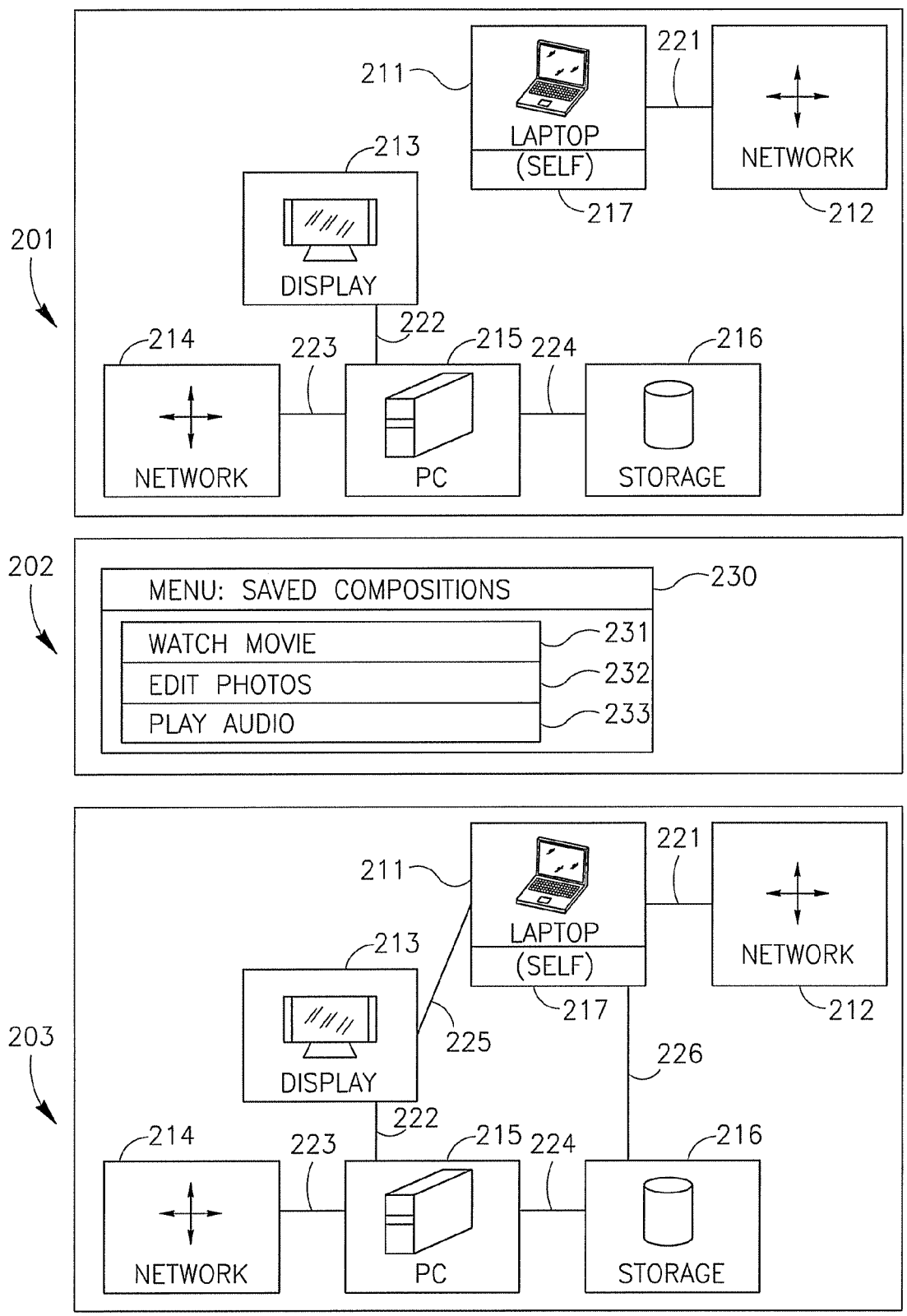
FIG. 2 is a schematic block diagram illustration of a multi-stage process of composition of logical computing platforms in accordance with some demonstrative embodiments of the invention.

FIG. 2 schematically illustrates a block diagram of a multi-stage process of composition of logical computing platforms in accordance with some demonstrative embodiments of the invention. For demonstrative purposes, the process of FIG. 2 is shown using three stages 201-203; other number or types of stages may be used. In some embodiments, stages 201-203 may correspond to screenshots or to output presented by a software application.

As shown in stage 201, a composition manager or a composition interface shows graphical and/or textual representations of wireless devices or wireless services or wireless resources that are available to the user for composition. The available resources are detected through wireless discovery processes. For example, a graphical/textual icon 211 represents a laptop computer, optionally having a "self" tag 217 indicating that it represents the computing device on which the composition manager operates. The graphical/textual icon 211 of the laptop computer is connected with a line 221 (representing a link) to a graphical/textual icon 212 representing a network. Similarly, a graphical/textual icon 215 represents a desktop computer or PC, which is connected using a link 223 (representing a link) to a graphical/textual icon 214 representing a network. The graphical/textual icon 215 of the desktop computer or PC is further connected using a link 222 (representing a link) to a graphical/textual icon 213 representing a display unit. The graphical/textual icon 215 of the desktop computer or PC is further connected using a link 224 (representing a link) to a graphical/textual icon 216 representing a storage unit.

As shown in stage 202, the composition manager or composition interface presents a list or menu of activities or tasks, from which the user may select an activity or task using a button interface, a menu interface, hyperlinks, or other interface components. For example, a menu 230 of saved compositions includes multiple items, e.g., a "watch movie" item 231, an "edit photos" item 232, and a "play audio" item 233. In some embodiments, menu items may be presented using a color code or other visual scheme to indicate whether an item is currently available or unavailable; for example, a menu item colored in red may indicate that the composition is currently unavailable; a menu item colored in green may indicate that the composition is currently fully available; and a menu item colored in yellow may indicate that the composition is currently partially available (e.g., if at least one of the required resources is available and at least one of the required resources is unavailable). Optionally, menu items may be sorted according to color or availability; menu items of a particular type (e.g., unavailable compositions) may be filtered-out or hidden; other suitable indication schemes may be used to notify the user as to context-based availability of resources, e.g., based on location, time, and nearby devices.

As shown in stage 203, upon selection of an activity or task by the user, the system automatically creates the one or more wireless links required in order to connect the remote services or components. For example, the user selects the "watch movie" item 231, which is associated with a set of instructions to connect between the laptop computer, the storage device and the display unit. In response, the laptop automatically establishes a wireless connection with the display unit, and a line 225 (representing the link) is presented. Similarly, the laptop automatically establishes a wireless connection with the storage device, and a line 226 (representing the link) is presented. The presentation in the composition manager or composition interface may be dynamically updated to reflect the established wireless connections.

Figure 3:
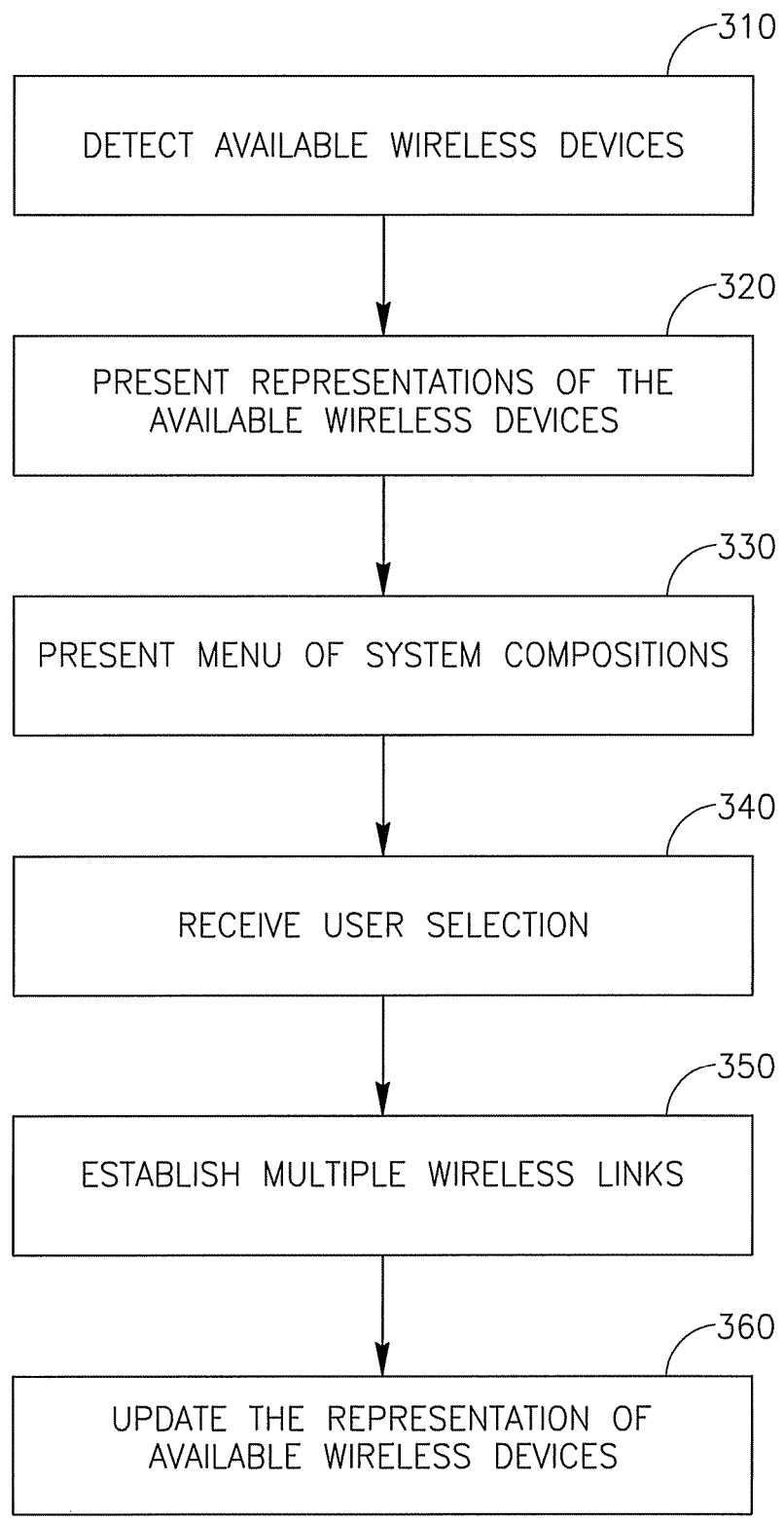
FIG. 3 is a schematic flow-chart of a method of composing logical computing platforms in accordance with some demonstrative embodiments of the invention.

FIG. 3 is a schematic flow-chart of a method of composing logical computing platforms in accordance with some demonstrative embodiments of the invention. Operations of the method may be used, for example, by system 100 of FIG. 1, by computing device 110 of FIG. 1, and/or by other suitable devices or systems. Although portions of the discussion herein relate, for demonstrative purposes, to wireless devices, the method of FIG. 2 may be used in conjunction with wireless devices and/or wireless services.

In some embodiments, the method may optionally include, for example, detecting available wireless devices (block 310).

In some embodiments, the method may optionally include, for example, presenting representations of the available wireless devices (block 320).

In some embodiments, the method may optionally include, for example, presenting a menu of representations of system compositions (block 330). In some embodiments, menu items may describe compositions (e.g., "laptop+display+storage" or "PDA+storage+keyboard"); in other embodiments, menu items may describe activities or tasks (e.g., "edit photos" or "watch movie").

In some embodiments, the method may optionally include, for example, receiving a user's selection of a system composition (block 340).

In some embodiments, the method may optionally include, for example, establishing multiple (or one or more) wireless communication links among multiple wireless components based associated with the user selection (block 350).

In some embodiments, the method may optionally include, for example, updating the representation of available wireless devices to reflect the established wireless links (block 360).

Other operations or sets of operations may be used in accordance with some embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless computing device comprising:
one or more wireless transceivers to send and receive wireless communication signals;
a logical platform composition manager to:
provide a visual indication representing a menu including a plurality of selectable items corresponding to a plurality of activities or tasks wherein the plurality of activities or tasks correspond to a plurality of logical platform compositions and each logical platform composition comprises a combination of the wireless computing device and at least one wireless device;
operate the one or more wireless transceivers to detect two or more wireless devices;
utilize a graphical representation to present the wireless computing device and each of the two or more wireless devices detected by the one or more wireless transceivers, the graphical representation to include a graphical icon for the wireless computing device and each of the two or more wireless devices detected by the one or more wireless transceivers;
determine which logical platform combinations are available based on the two or more wireless devices detected;
utilize a first visual scheme to present a first selectable item of the plurality of selectable items that represents a first task that corresponds to an available logical platform composition, wherein performance of the first task requires the available logical platform composition, the available logical platform composition to include at least two of the two or more wireless devices detected; and
utilize a second visual scheme to present a second selectable item of the plurality of selectable items that represents a second task that corresponds to an unavailable logical platform composition, wherein performance of the second task requires the unavailable logical platform composition;
an input unit to receive a user selection of the first selectable item of the plurality of selectable items that represents the first task that corresponds to the available logical platform composition, wherein, in response to the user selection, the logical platform composition manager to command the one or more wireless transceivers to automatically establish two or more wireless communication links between the wireless computing device and the at least two wireless devices of the available logical platform composition based on a set of composition instructions that correspond to the first task; and
update the graphical representation to include a line for each of the two or more wireless communication links established between the wireless computing device and the at least two wireless devices of the available logical platform composition, the line for each of the two or more wireless communication links to connect the graphical icon for the wireless computing device to the graphical icon for a respective wireless device of the at least two wireless devices.

2. The wireless computing device of claim 1, wherein the logical platform composition manager comprises:
a discoverer module to automatically detect that the wireless computing device is able to wirelessly connect to the two or more wireless devices.

3. The wireless computing device of claim 2, wherein the logical platform composition manager is to provide visual representations of wireless devices available for wireless communication with the wireless computing device, wherein the input unit is to receive a user input indicating a selection of one or more wireless devices to be wirelessly connected to the wireless computing device, and wherein the logical platform composition manager is to store a representation of the logical platform comprising the wireless computing device and the one or more wireless devices selected by the user.

4. The wireless computing device of claim 1, wherein the two or more wireless communication links comprise:
a first wireless communication link in accordance with a first wireless communication protocol; and
a second wireless communication link in accordance with a second, different, wireless communication protocol.

5. The wireless computing device of claim 4, wherein the one or more transceivers are to establish substantially simultaneously the first and second wireless communication links.

6. The wireless computing device of claim 4, wherein the one or more transceivers are to sequentially establish the first wireless communication link and then the second wireless communication link.

7. The wireless computing device of claim 1, comprising: a processor to process data received from the two or more wireless devices.

8. The wireless computing device of claim 1, wherein the wireless computing device comprises a device selected from the group consisting of: a laptop computer, a notebook computer, a tablet computer, a desktop computer, a cellular phone, a handheld device, a wireless communication device, a wireless communication station, and a Personal Digital Assistant device.

9. A computer-implemented method comprising:
presenting a menu including a plurality of selectable items corresponding to a plurality of activities or tasks wherein the plurality of activities or tasks correspond to a plurality of logical platform compositions and each logical platform composition comprises a combination of a wireless computing device and at least one wireless device;
detecting two or more wireless devices;
utilizing a graphical representation to present the wireless computing device and each of the two or more wireless devices detected, the graphical representation to include a graphical icon for the wireless computing device and each of the two or more wireless devices detected;
determining which logical platform combinations are available based on the two or more wireless devices detected;
utilizing a first visual scheme to present a first selectable item of the plurality of selectable items that represents a first task that corresponds to an available logical platform composition, wherein performance of the first task requires the available logical platform composition, the available logical platform composition to include at least two of the two or more wireless devices detected;
utilizing a second visual scheme to present a second selectable item of the plurality of selectable items that represents a second task that corresponds to an unavailable logical platform composition, wherein performance of the second task requires the unavailable logical platform composition;
receiving a user selection of a selectable menu item corresponding to the first task; and
establishing two or more wireless communication links between the wireless computing device and the at least two wireless devices of the available logical platform composition based on a set of composition instructions that correspond to the first task
updating the graphical representation to include a line for each of the two or more wireless communication links established between the wireless computing device and the at least two wireless devices of the available logical platform composition, the line for each of the two or more wireless communication links to connect the graphical icon for the wireless computing device to the graphical icon for a respective wireless device of the at least two wireless devices.

10. The method of claim 9, comprising:
presenting a visual representation of the wireless computing device and visual representations of two or more wireless devices;
receiving a user input indicating a request to selectively connect the wireless computing device to at least one of the two or more wireless devices; and
storing a selectable menu item in the menu, the menu item corresponding to a logical platform composition, the logical platform composition comprising the wireless computing device and said at least one wireless device.

11. The method of claim 9, wherein the two or more wireless communication links comprise:
a first wireless communication link in accordance with a first wireless communication protocol; and
a second wireless communication link in accordance with a second, different, wireless communication protocol.

12. The method of claim 11, comprising establish the first and second wireless communication links substantially simultaneously.

13. The method of claim 11, comprising establish the first and second wireless communication links sequentially.

* * * * *